(12) United States Patent
Matsumura

(10) Patent No.: US 9,372,485 B2
(45) Date of Patent: Jun. 21, 2016

(54) FLOW RATE CONTROL DEVICE

(71) Applicant: SMC KABUSHIKI KAISHA, Chiyoda-ku (JP)

(72) Inventor: Kenichi Matsumura, Kashiwa (JP)

(73) Assignee: SMC KABUSHIKI KAISHA, Chiyoda-ku (JP)

( * ) Notice: Subject to any disclaimer, the term of this patent is extended or adjusted under 35 U.S.C. 154(b) by 82 days.

(21) Appl. No.: 14/353,416

(22) PCT Filed: Oct. 24, 2012

(86) PCT No.: PCT/JP2012/077397
§ 371 (c)(1),
(2) Date: Apr. 22, 2014

(87) PCT Pub. No.: WO2013/065530
PCT Pub. Date: May 10, 2013

(65) Prior Publication Data
US 2014/0264106 A1 Sep. 18, 2014

(30) Foreign Application Priority Data

Nov. 2, 2011 (JP) ................................. 2011-241074

(51) Int. Cl.
*F15B 13/043* (2006.01)
*G05D 7/03* (2006.01)
(Continued)

(52) U.S. Cl.
CPC ................ *G05D 7/03* (2013.01); *F15B 11/068* (2013.01); *F16K 1/52* (2013.01); *F16K 17/30* (2013.01);
(Continued)

(58) Field of Classification Search
CPC ............... Y10T 137/86614; Y10T 137/87193; Y10T 137/87225
See application file for complete search history.

(56) References Cited

U.S. PATENT DOCUMENTS 5,067,519 A * 11/1991 Russell ................ F15B 11/068
137/107
5,337,788 A 8/1994 Nelson
(Continued)

FOREIGN PATENT DOCUMENTS

DE 30 27 022 A1 2/1981
EP 2047108 1/2010
(Continued)

OTHER PUBLICATIONS

Combined Office Action and Search Report issued May 13, 2015 in Taiwanese Patent Application No. 101140061 (with English language translation).
(Continued)

*Primary Examiner* — R. K. Arundale
(74) *Attorney, Agent, or Firm* — Oblon, McClelland, Maier & Neustadt, L.L.P

(57) ABSTRACT

A flow rate control device, including: a body including first and second ports for supplying and discharging pressurized fluid; a set of first and second solenoid valves connected to an upper part of the body and selecting a state of flow of the pressurized fluid; and an opening/closing valve for increasing a flow rate of the pressurized fluid which flows as the result of selection by the first and second solenoid valves. The pressurized fluid is caused to flow from the first port to the second port at a predetermined flow rate while the opening/closing valve is closed, and then the flow rate of the pressurized fluid flowing from the first port to the second port is increased by opening the opening/closing valve.

10 Claims, 15 Drawing Sheets

(51) Int. Cl.
  *F15B 11/068* (2006.01)
  *F16K 1/52* (2006.01)
  *F16K 17/30* (2006.01)

(52) U.S. Cl.
  CPC . *F15B 2211/40515* (2013.01); *F15B 2211/851* (2013.01); *F15B 2211/853* (2013.01); *F15B 2211/8636* (2013.01); *F15B 2211/8757* (2013.01); *F15B 2211/8855* (2013.01); *Y10T 137/86614* (2015.04)

(56) References Cited

U.S. PATENT DOCUMENTS

| | | | | |
|---|---|---|---|---|
| 5,381,828 | A * | 1/1995 | Kimura | F15B 11/068 137/596 |
| 5,669,422 | A | 9/1997 | Tarusawa | |
| 7,891,375 | B2 | 2/2011 | Decker | |
| 8,567,442 | B2 * | 10/2013 | Christiani | F15B 11/068 137/1 |
| 2006/0070673 | A1 * | 4/2006 | Decker | F15B 11/068 137/628 |
| 2008/0128036 | A1 * | 6/2008 | Decker | F15B 11/0406 137/629 |

FOREIGN PATENT DOCUMENTS

| | | |
|---|---|---|
| JP | 54-101069 A | 8/1979 |
| JP | 55-126107 A | 9/1980 |
| JP | 55-144202 | 10/1980 |
| JP | 61-019207 | 6/1986 |
| JP | 62-108602 U | 7/1987 |
| JP | 07-035106 | 2/1995 |
| JP | 3016029 | 9/1995 |
| JP | 2544693 | 8/1997 |
| JP | 2565816 | 3/1998 |
| JP | 3530557 | 5/2004 |

OTHER PUBLICATIONS

International Search Report issued Jan. 29, 2013, in PCT/JP12/077397, filed Oct. 24, 2012.
Office Action issued Apr. 5, 2016 in Japanese Patent Application No. 2013-541714 (with English Translation).

* cited by examiner

FLOW RATE CONTROL DEVICE

TECHNICAL FIELD

The present invention relates to a flow rate control apparatus (device), which is capable of controlling the flow condition and flow rate of a pressure fluid under an opening/closing action of a valve body.

BACKGROUND ART

Heretofore, a flow rate control apparatus has been known, in which a pressure fluid supplied from a pressure fluid supply source is controlled at a predetermined flow rate, and is supplied to a fluid pressure device or the like connected to a secondary side. With such a flow rate control apparatus, for example, as disclosed in European Patent No. 2047108, a soft start technique is adopted in which, initially, a pressure fluid is made to flow through a throttle valve in which the flow rate of the pressure fluid is restricted, and after elapse of a predetermined time, the valve body is switched to an open state and the flow rate of the pressure fluid is increased. By means of this structure, abrupt supply of a pressure fluid having a large flow rate with respect to a fluid pressure device connected to a secondary side of the flow rate control apparatus, thereby causing damage to the fluid pressure device, is prevented.

SUMMARY OF INVENTION

A flow rate control apparatus having the aforementioned soft start technique incorporated therein is equipped with a main valve that controls the flow rate of the pressure fluid, and a switching valve that controls opening and closing of the main valve, and thus a piping arrangement, which serves to connect the main valve and the switching valve with each other, is required. For this reason, the flow rate control apparatus, which includes such a piping arrangement, tends to be large in size, and the number of parts that make up the apparatus is increased. Further, when the flow rate control apparatus is assembled, since operations must be preformed to connect the piping arrangement, assembly of the apparatus is complex.

A general object of the present invention is to provide a flow rate control apparatus, in which the number of parts that make up the apparatus are reduced and the apparatus is small in scale, and which is capable of reliably discharging a residual pressure fluid.

The present invention is characterized by a flow rate control apparatus comprising a body having a pair of ports through which a pressure fluid is supplied and discharged, discharge ports through which a residual pressure fluid on a secondary side is discharged, and passages connected to the ports and the discharge ports, and through which the pressure fluid flows, an adjustment mechanism for adjusting a flow rate of the pressure fluid that flows from one of the ports to another of the ports, and at least two switching valves that switch a communication state of the ports, the passages, and the discharge ports.

The adjustment mechanism includes a throttle valve for adjusting the flow rate of the pressure fluid that flows between the one port and the other port, and an opening/closing valve capable of switching the communication state of the one port and the other port, wherein the flow rate of the pressure fluid is increased or decreased in a stepwise manner under a switching action of the opening/closing valve.

According to the present invention, the at least two switching valves for switching the communication state of the pair of ports, the passages, and the discharge ports, and the adjustment mechanism for adjusting the flow rate of the pressure fluid from the one port to the other port are connected integrally with respect to the body, and together therewith, the adjustment mechanism is equipped with a throttle valve for adjusting the flow rate of the pressure fluid that flows between the one port and the other port, and the opening/closing valve capable of switching the communication state of the one port and the other port. Consequently, compared to a case of separately providing the body, the adjustment mechanism, and the switching valve, etc., which are connected respectively by piping or the like, since a piping arrangement is rendered unnecessary, the number of component parts and assembly steps can be reduced, and the flow rate control apparatus can be made smaller in scale. Further, since at least two switching valves are provided, even if for some reason one of the switching valves malfunctions and becomes inoperative, by operating a remaining one of the switching valves that can be operated normally, the pressure fluid on the secondary side can reliably be discharged to the exterior.

The above and other objects, features and advantages of the present invention will become more apparent from the following description when taken in conjunction with the accompanying drawings in which preferred embodiments of the present invention are shown by way of illustrative example.

DESCRIPTION OF EMBODIMENTS

Figure 1:
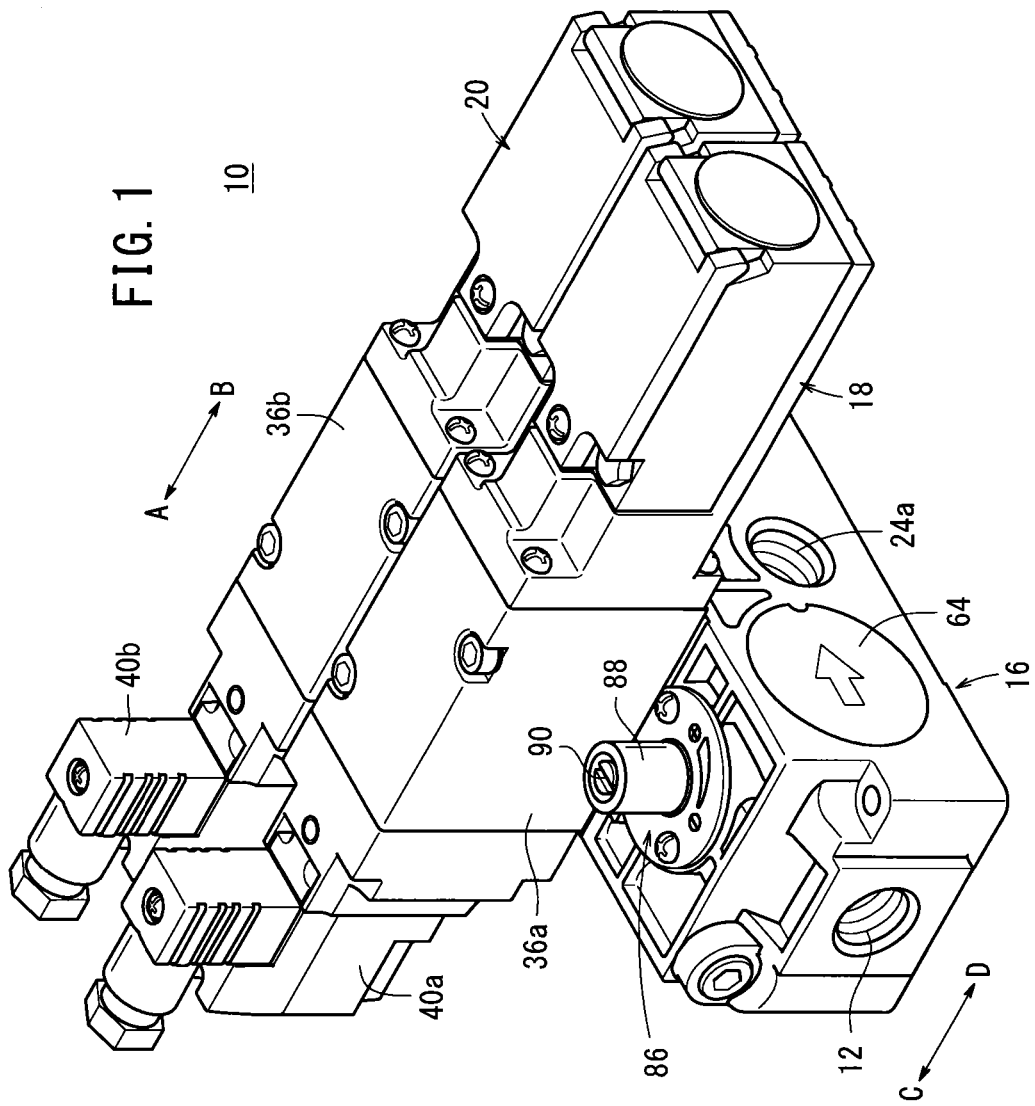
FIG. 1 is an exterior perspective view showing the appearance of a flow rate control apparatus according to a first embodiment of the present invention.
Figure 2:
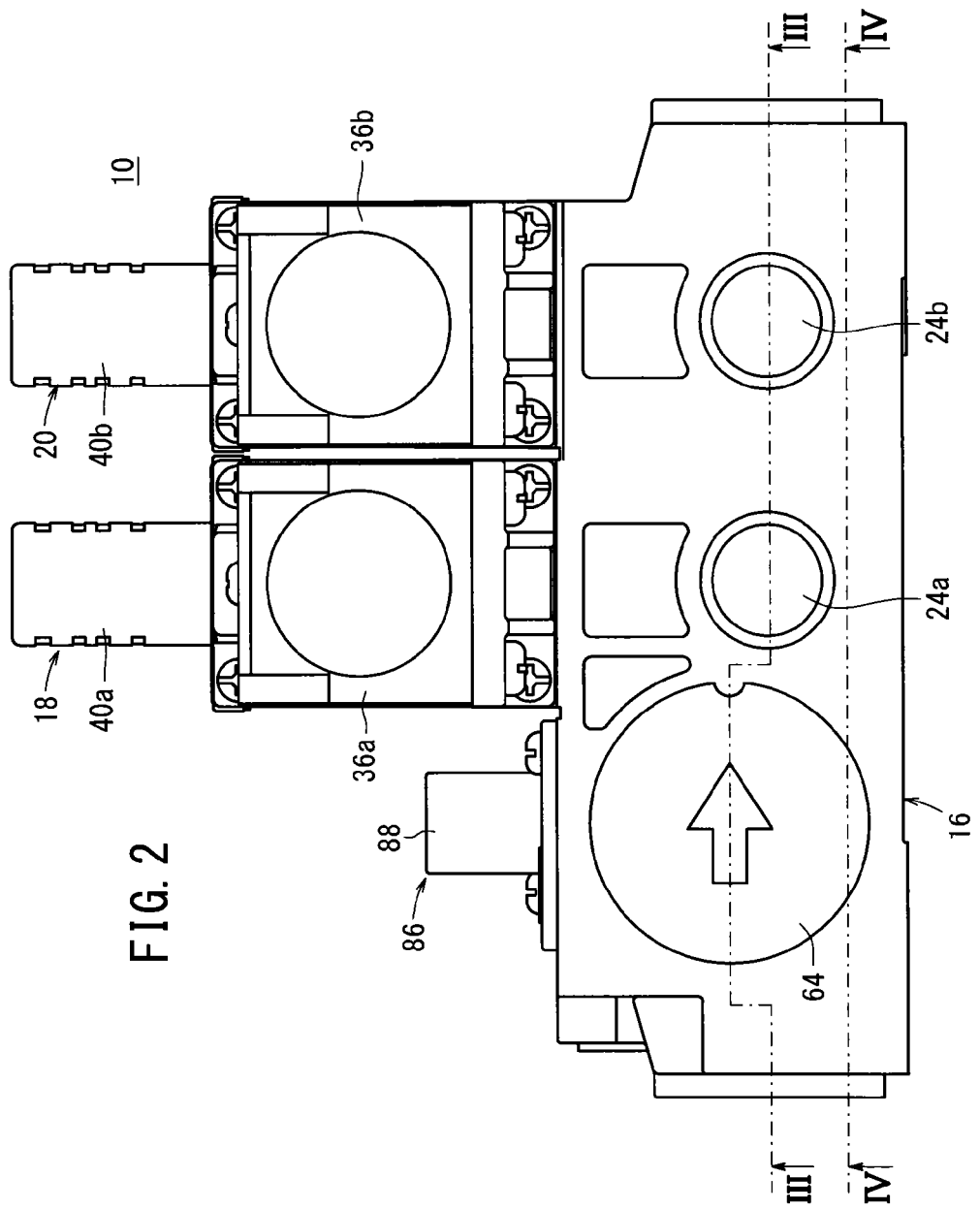
FIG. 2 is a front view of the flow rate control apparatus shown in FIG. 1.

As shown in FIGS. 1 through 9, a flow rate control apparatus 10 according to a first embodiment includes a body 16 having first and second ports 12, 14 through which a pressure fluid is supplied and discharged, a pair of first and second solenoid valves (switching valves) 18, 20 connected to an upper part of the body 16 and which switch a flow condition of the pressure fluid, and an opening/closing valve (adjustment mechanism) 22 that acts to increase the flow rate of the flowing pressure fluid under the switching action of the first and second solenoid valves 18, 20.

The body 16, for example, is rectangular in cross section and is formed with a longitudinal dimension along the horizontal direction. The first port 12 opens on one end, and the second port 14 opens on another end surface thereof. The first port 12 is connected to a non-illustrated pressure fluid supply source from which a pressure fluid is supplied thereto, whereas the second port 14 is connected, for example, to a non-illustrated fluid pressure device or the like.

Further, a pair of discharge ports 24*a*, 24*b* (see FIGS. 2 and 3), which open in a direction perpendicular to that of the first and second ports 12, 14, are formed on a side surface of the body 16. Non-illustrated pipes, which open to atmosphere, are connected to the discharge ports 24*a*, 24*b*.

Figure 3:
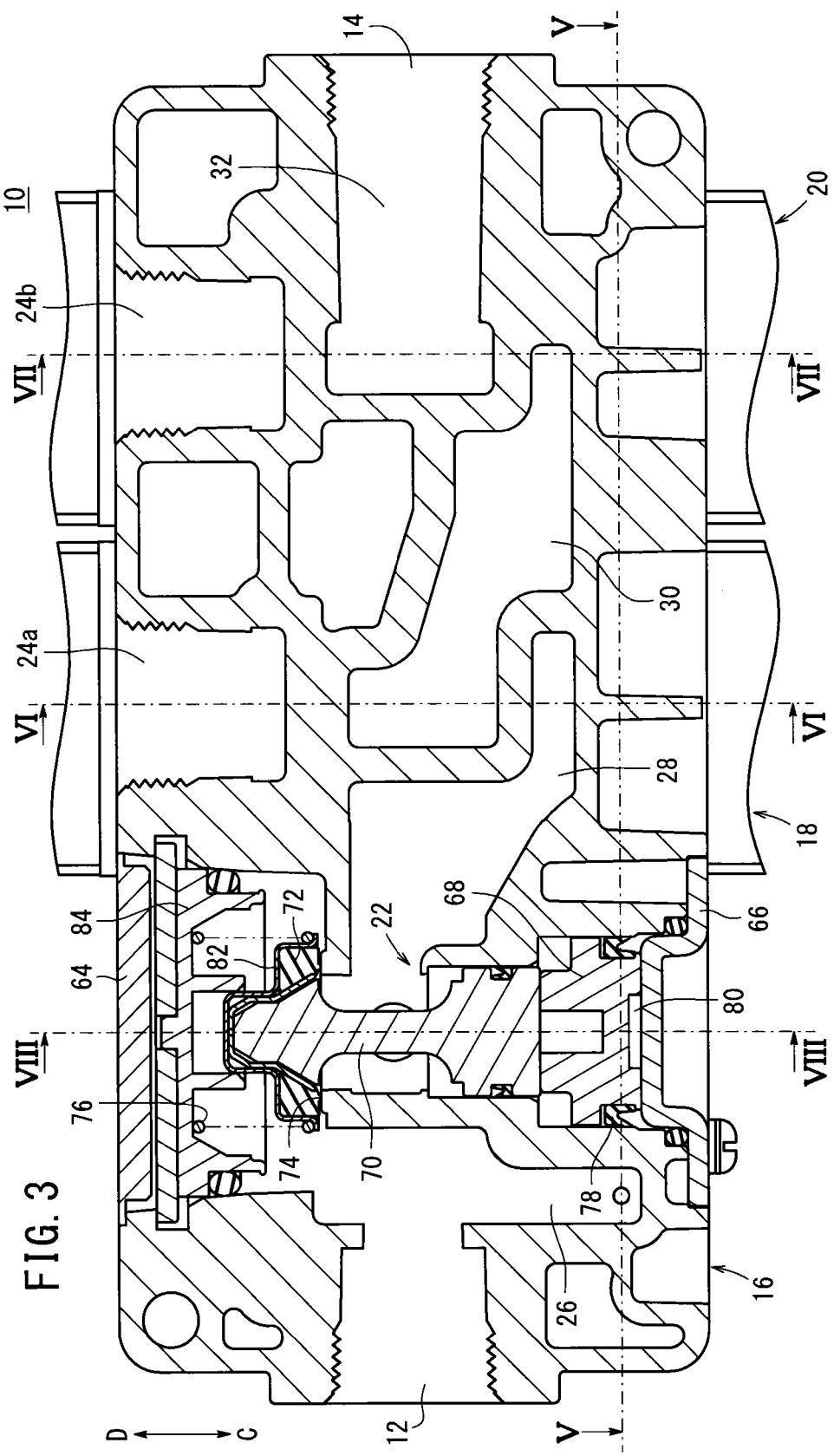
FIG. 3 is a cross sectional view taken along line III-III of FIG. 2.
Figure 4:
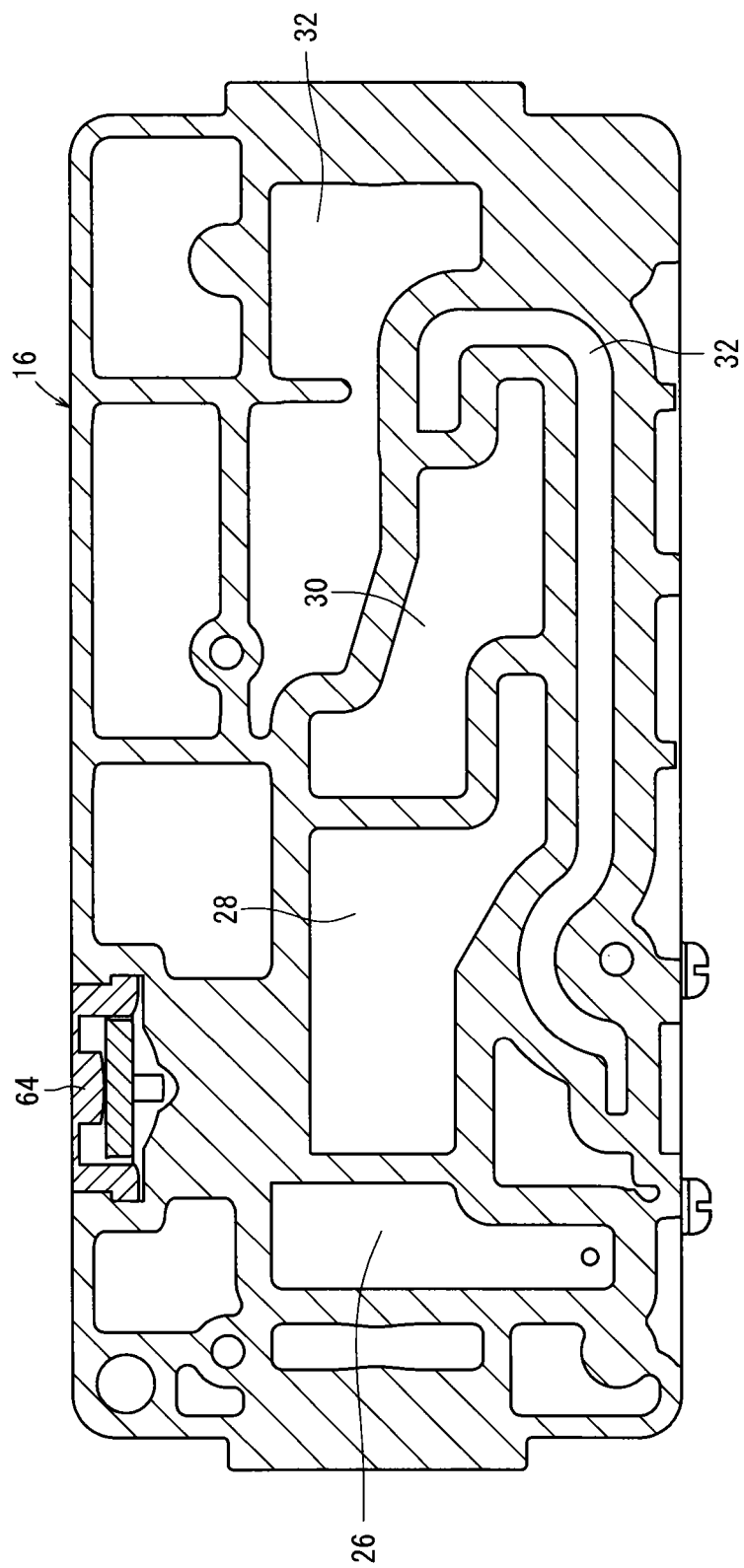
FIG. 4 is a cross sectional view taken along line IV-IV of FIG. 2.

On the other hand, as shown in FIGS. 3 and 4, in the interior of the body 16, there are formed a first flow passage 26 that communicates with the first port 12, a second flow passage 28 that communicates with the first flow passage 26 in a valve-open state of a later-described opening/closing valve 22, a third flow passage 30 that communicates with the second flow passage 28 under a switching action of the first solenoid valve 18, and a fourth flow passage 32 that communicates with the third flow passage 30 under a switching action of the second solenoid valve 20.

Between the first flow passage 26 and the second flow passage 28, a communication chamber 34 is formed through which the first flow passage 26 and the second flow passage 28 communicate. An opening/closing valve 22, which is capable of adjusting the flow rate of the pressure fluid that flows from the first flow passage 26 to the second flow passage 28, is disposed in the communication chamber 34. Further, the third flow passage 30 communicates with the interior of the first solenoid valve 18 that is connected to the upper portion of the body 16, and the fourth flow passage 32 communicates with the second port 14 and the interior of the second solenoid valve 20 that is connected to the upper portion of the body 16.

Figure 5:
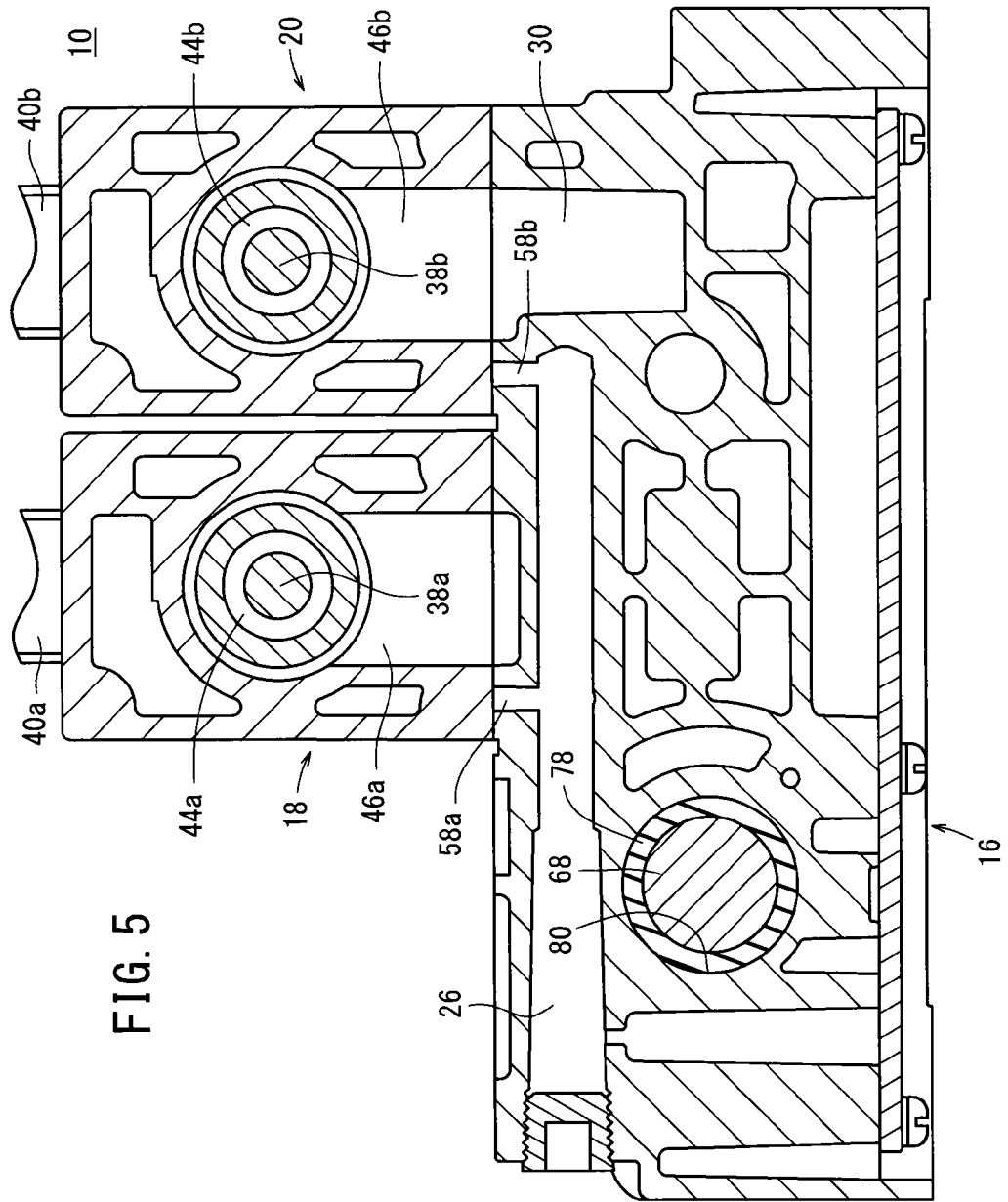
FIG. 5 is a cross sectional view taken along line V-V of FIG. 3.
Figure 7:
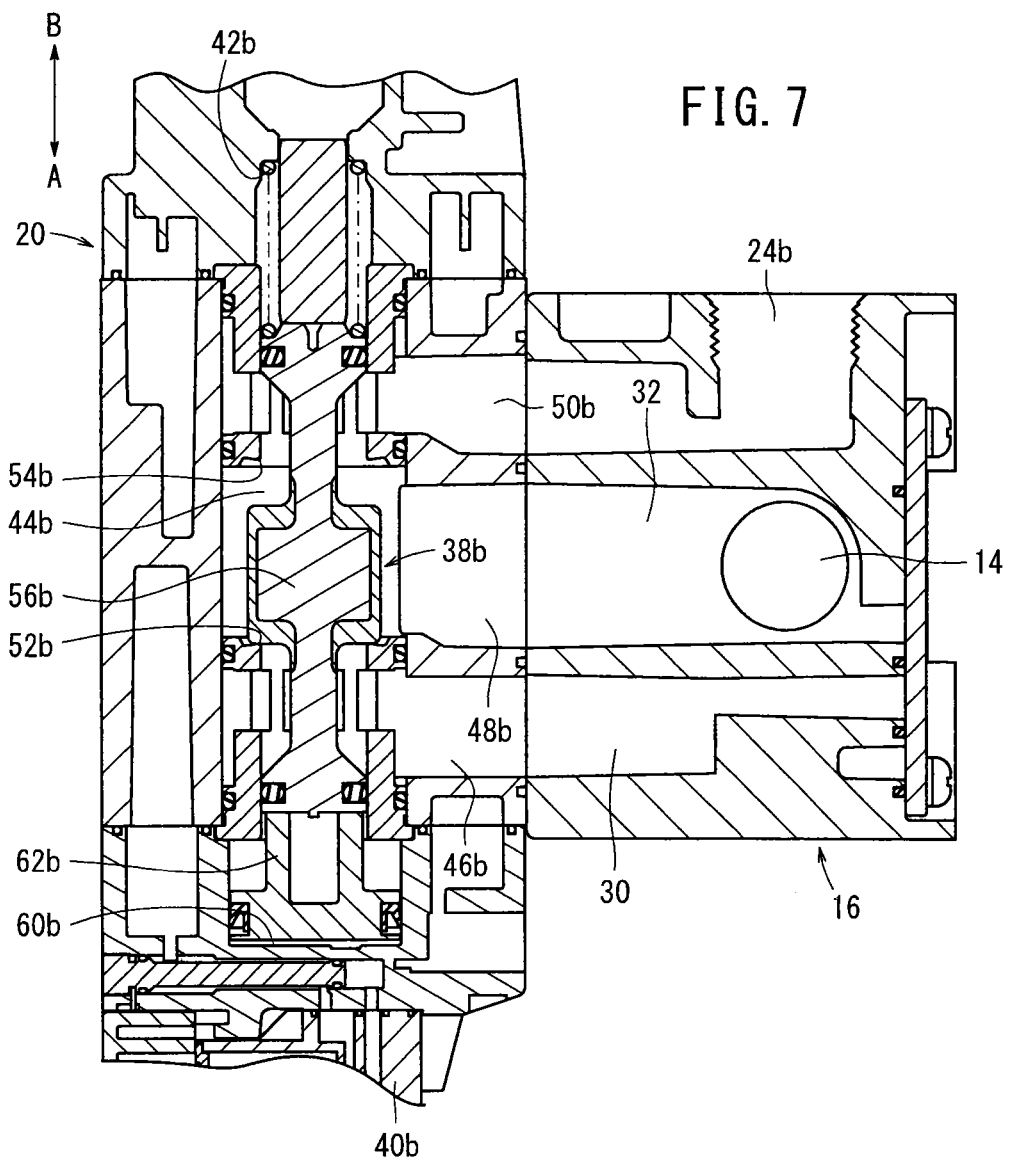
FIG. 7 is a cross sectional view taken along line VII-VII of FIG. 3.
Figure 8:
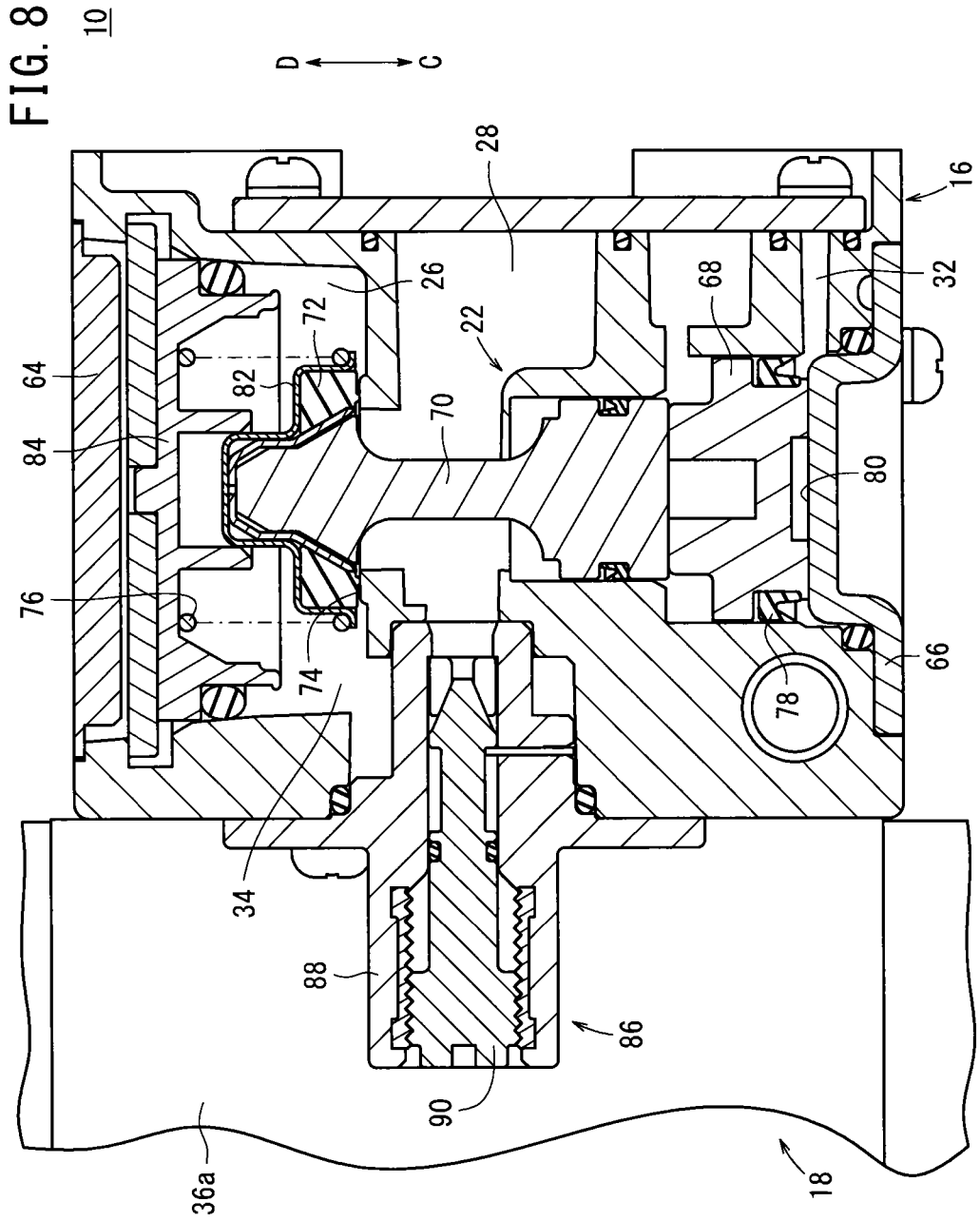
FIG. 8 is a cross sectional view taken along line VIII-VIII of FIG. 3.
Figure 9:
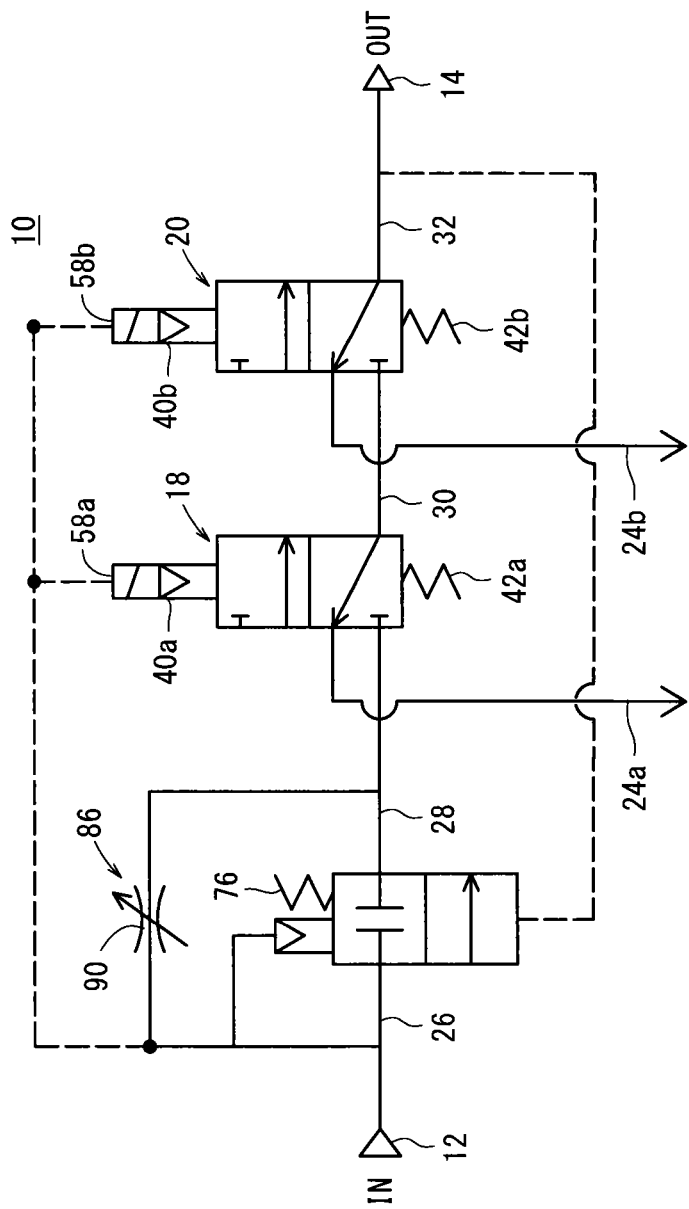
FIG. 9 is a circuit diagram of the flow rate control apparatus shown in FIG. 1.

As shown in FIGS. 5, 7 and 9, the first and second solenoid valves 18, 20 are made up from housings 36*a*, 36*b*, which are formed in substantially the same shape and are connected with respect to the body 16, shaft valves 38*a*, 38*b*, which are disposed displaceably in an axial direction (the directions of arrows A and B) in the interiors of the housings 36*a*, 36*b*, solenoid sections 40*a*, 40*b*, which are connected to ends of the housings 36*a*, 36*b* and effect displacement of the shaft valves 38*a*, 38*b* in the axial direction (the directions of arrows A and B), and springs 42*a*, 42*b* that bias the shaft valves 38*a*, 38*b* toward the side of the solenoid sections 40*a*, 40*b* (in the direction of the arrow A).

The first solenoid valve 18 and the second solenoid valve 20 are arranged in series between the first port 12 and the second port 14, as shown in FIG. 9.

The structure of the first solenoid valve 18 will be explained with reference to FIG. 6. Since the structure of the second solenoid valve 20 is basically the same as that of the first solenoid valve 18, detailed description thereof is omitted, and reference numerals therefor are indicated in parenthesis.

The housing 36*a* (36*b*) that makes up the first solenoid valve 18 is formed with a shaft hole 44*a* (44*b*) that penetrates therethrough in the axial direction (the directions of arrows A and B), and a shaft valve 38*a* (38*b*) is disposed displaceably in the interior of the shaft hole 44*a* (44*b*). Further, first through third communication passages 46*a* (46*b*), 48*a* (48*b*), 50*a* (50*b*) are formed in the housing 36*a* (36*b*), extending in directions perpendicular to the direction of the shaft hole 44*a* (44*b*). The first communication passage 46*a* communicates with the second flow passage 28 of the body 16, the second communication passage 48*a* communicates with the third flow passage 30 of the body 16, and the third communication passage 50*a* communicates with the discharge port 24*a* in the body 16.

Moreover, the first through third communication passages 46*a* (46*b*), 48*a* (48*b*), 50*a* (50*b*) are separated by predetermined intervals mutually in the axial direction (the directions of arrows A and B) of the housing 36*a* (36*b*).

First and second valve seats 52*a* (52*b*), 54*a* (54*b*) on which a valve section 56*a* (56*b*) of the shaft valve 38*a* (38*b*) is seated are formed in the shaft hole 44*a* (44*b*). The valve section 56*a* (56*b*) is arranged between the first valve seat 52*a* (52*b*) and the second valve seat 54*a* (54*b*).

In addition, the shaft valve 38*a* is displaced in the axial direction (in the direction of the arrow A), and by the valve section 56*a* thereof being seated on the first valve seat 52*a*, communication between the second flow passage 28 and the third flow passage 30 through the first and second communication passages 46*a*, 48*a* is blocked. On the other hand, by displacement of the shaft valve 38*a* in the opposite direction (in the direction of the arrow B), the valve section 56*a* thereof is seated on the second valve seat 54*a*, and communication between the third flow passage 30 and the discharge port 24*a* through the second and third communication passages 48*a*, 50*a* is blocked.

Further, a spring 42*a* (42*b*) is interposed between the housing 36*a* (36*b*) and one end portion of the shaft valve 38*a* (38*b*). The spring 42*a* (42*b*) biases the shaft valve 38*a* (38*b*) toward the side of the solenoid section 40*a* (40*b*) (in the direction of the arrow A). In this manner, the valve section 56*a* (56*b*) of the shaft valve 38*a* (38*b*) is seated with respect to the first valve seat 52*a* (52*b*).

The solenoid section 40*a* (40*b*) is excited by inputting to a coil thereof (not shown) a control signal from a non-illustrated controller, whereby pilot air, which is supplied to a pilot supply port 58*a* (58*b*) in communication with the first flow passage 26 of the body 16, is supplied to a first piston chamber 60*a* (60*b*). In addition, a first piston 62*a* (62*b*), which is disposed displaceably in the first piston chamber 60*a* (60*b*), is pressed and displaced by the pilot air toward the side of the housing 36*a* (36*b*) (in the direction of the arrow B).

The first piston 62*a* (62*b*) is disposed so as to abut against another end of the shaft valve 38*a* (38*b*) that is disposed in the housing 36*a* (36*b*). Upon displacement of the first piston 62*a* (62*b*), the shaft valve 38*a* (38*b*) is pressed in opposition to the elastic force of the spring 42*a* (42*b*). As a result, the valve section 56*a* (56*b*) separates away from the first valve seat 52*a* (52*b*), and is displaced into abutment against the second valve seat 54*a* (54*b*).

Further, in the same manner as in the first solenoid valve 18, first through third communication passages 46*b*, 48*b*, 50*b* are formed in the housing 36*b* that makes up the second solenoid valve 20. The first communication passage 46*b* communicates with the third flow passage 30 of the body 16, the second communication passage 48*b* communicates with the fourth flow passage 32 of the body 16, and the third communication passage 50*b* communicates with the discharge port 24*b* in the body 16. The first and second solenoid valves 18, 20 are 3-port valves, as described above.

As shown in FIG. 3, the opening/closing valve 22 is disposed perpendicularly to the direction of extension of the first port 12, and is inserted into the interior of the body 16 through an opening that opens in a side wall of the body 16. The opening is closed respectively by both of first and second cover members 64, 66.

The opening/closing valve 22 includes a second piston 68, which is displaced in an axial direction (the directions of arrows C and D) under the supply of a pressure fluid, a push rod 70, which abuts against the second piston 68 and is displaced in unison therewith, a valve body 72, which is mounted on an end of the push rod 70 and serves to switch the state of communication between the first flow passage 26 and the second flow passage 28 in the body 16, and a return spring 76 that biases the valve body 72 toward the side of a valve seat 74 (in the direction of the arrow C).

The second piston 68 is disposed in a second piston chamber 80, and has an annular piston packing 78 installed on an outer circumferential surface thereof. Additionally, the second piston chamber 80 communicates at an outer circumferential side thereof with the fourth flow passage 32, and by supply of a pressure fluid to the second piston piston 68 is pressed and urged toward the side of the valve body 72 (in the direction of the arrow D).

One end of the push rod 70 abuts against an end surface of the second piston 68, and the ring-shaped valve body 72 abuts against another end of the push rod 70 through a holder 82. Moreover, the valve body 72 is formed from an elastic material such as rubber or the like, which is disposed on an outer circumferential side on the other end of the push rod 70.

Further, the return spring 76 is interposed on an outer edge portion of the holder 82 between the holder 82 and a spring holder 84 that is disposed in the body 16. In addition, through the holder 82, the return spring 76 biases the valve body 72 (in the direction of the arrow C) toward the side of the annular valve seat 74 that is formed in the body 16. The valve seat 74 is formed at a border between the first flow passage 26 and the second flow passage 28.

Further, in the vicinity of the opening/closing valve 22, a throttle mechanism 86 is provided, which is capable of adjusting the flow rate of the pressure fluid that flows between the first flow passage 26 and the second flow passage 28. The throttle mechanism 86 is equipped with a needle holder 88 connected to a side surface of the body 16, and a needle valve (throttle valve) 90 that is screw-engaged in the needle holder 88. The needle valve 90 is disposed perpendicularly to the push rod 70. The needle valve 90 is screwed so as to be capable of being advanced and retracted in an axial direction, such that by adjusting a clearance between a tapered distal end thereof and the needle holder 88, the flow rate of a pressure fluid that flows through the clearance from the first flow passage 26 to the second flow passage 28 is adjusted.

The flow rate control apparatus 10 according to the first embodiment of the present invention is constructed basically as described above. Next, operations and advantages thereof will be explained. Pipes (not shown) are connected respectively to the first and second ports 12, 14 and the discharge ports 24a, 24b. Pressure fluid from a non-illustrated pressure fluid supply source is supplied beforehand with respect to the first port 12.

Further, in the flow rate control apparatus 10, an initial condition will be described, in which the valve body 72 of the opening/closing valve 22 is seated on the valve seat 74, thereby blocking communication between the first flow passage 26 and the second flow passage 28, and the first and second solenoid valves 18, 20 are in a non-energized condition such that communication of the second through fourth flow passages 28, 30, 32 is blocked. In this case, the pressure fluid, which is supplied from the first port 12 to the first flow passage 26, flows to the second flow passage 28 after being restricted to a predetermined flow rate by the throttle mechanism 86.

Figure 6:
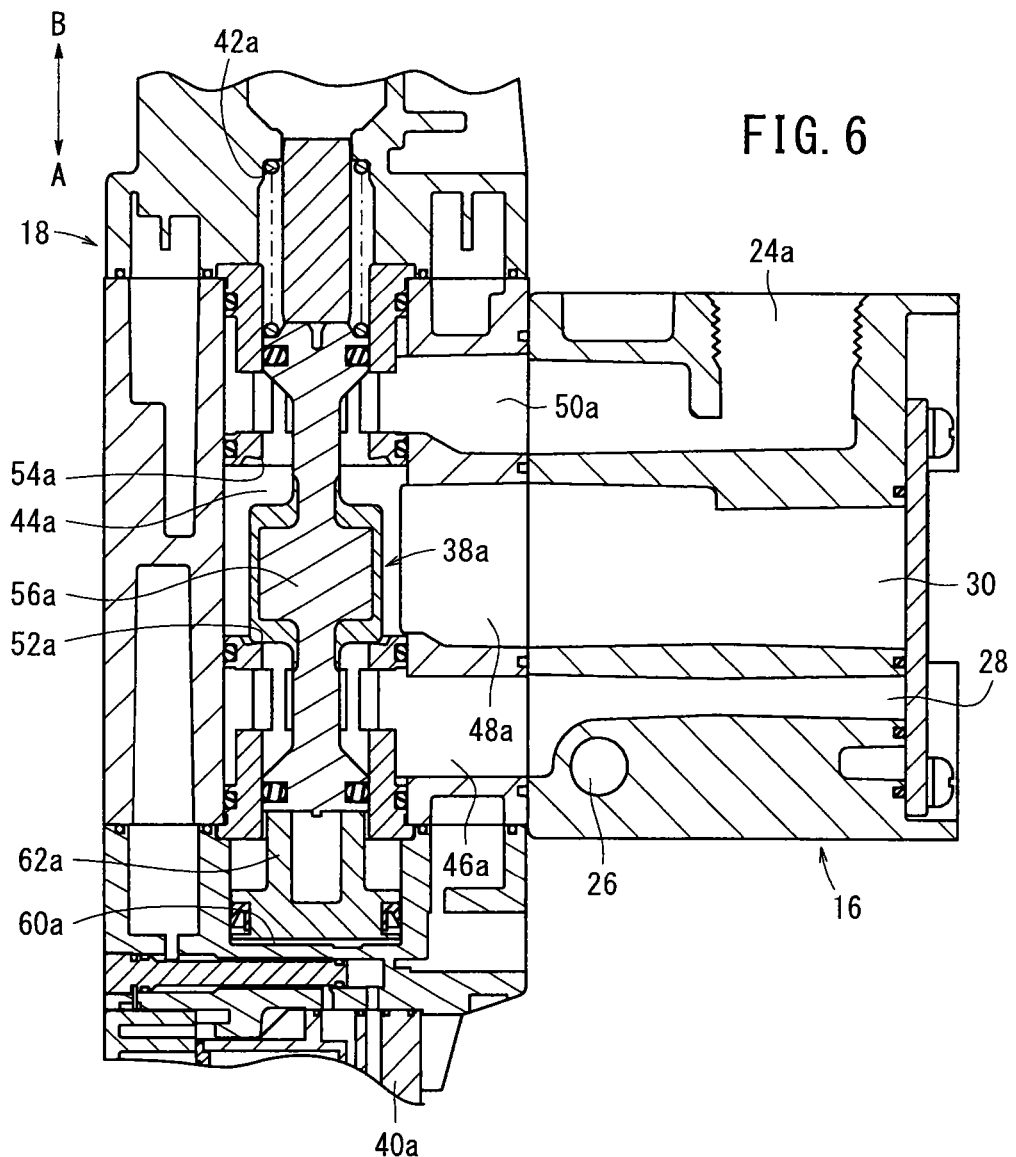
FIG. 6 is a cross sectional view taken along line VI-VI of FIG. 3.

In the initial condition, as shown in FIGS. 3, 6 and 7, first, by supplying current to energize the solenoid section 40a of the first solenoid valve 18 shown in FIG. 6, pilot air is supplied to the first piston chamber 60a, accompanied by the first piston 62a being displaced, and the shaft valve 38a is displaced integrally therewith in a direction (the direction of the arrow B) to separate away from the solenoid section 40a. Consequently, the valve section 56a separates away from the first valve seat 52a in opposition to the elastic force of the spring 4a. In addition, by seating of the valve section 56a on the second valve seat 54a, communication is established between the first communication passage 46a and the second communication passage 48a, and the pressure fluid, which is supplied to the second flow passage 28, flows to the third flow passage 30. In this case, the second solenoid valve 20 is in a non-energized state and current is not supplied thereto.

Next, while current continues to be supplied to the first solenoid valve 18, current also is supplied to energize the solenoid section 40b of the second solenoid valve 20. Accordingly, pilot air is supplied to the first piston chamber 60b of the second solenoid valve 20, accompanied by the first piston 62b being displaced, and the shaft valve 38b is displaced integrally therewith in a direction (the direction of the arrow B) to separate away from the solenoid section 40b. As a result, the valve section 56b of the second solenoid valve 20 separates away from the first valve seat 52b, communication is established between the first communication passage 46b and the second communication passage 48b, and the pressure fluid, which is supplied to the third flow passage 30, flows to the fourth flow passage 32 and thereafter is discharged from the second port 14.

Figure 10:
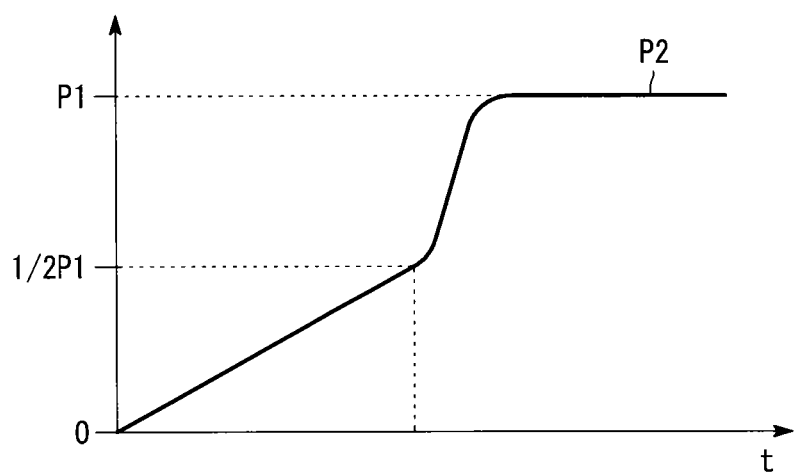
FIG. 10 is a characteristic curve showing a relationship between the pressure of a pressure fluid supplied to a first port and the pressure of the pressure fluid discharged from a second port.
Figure 11:
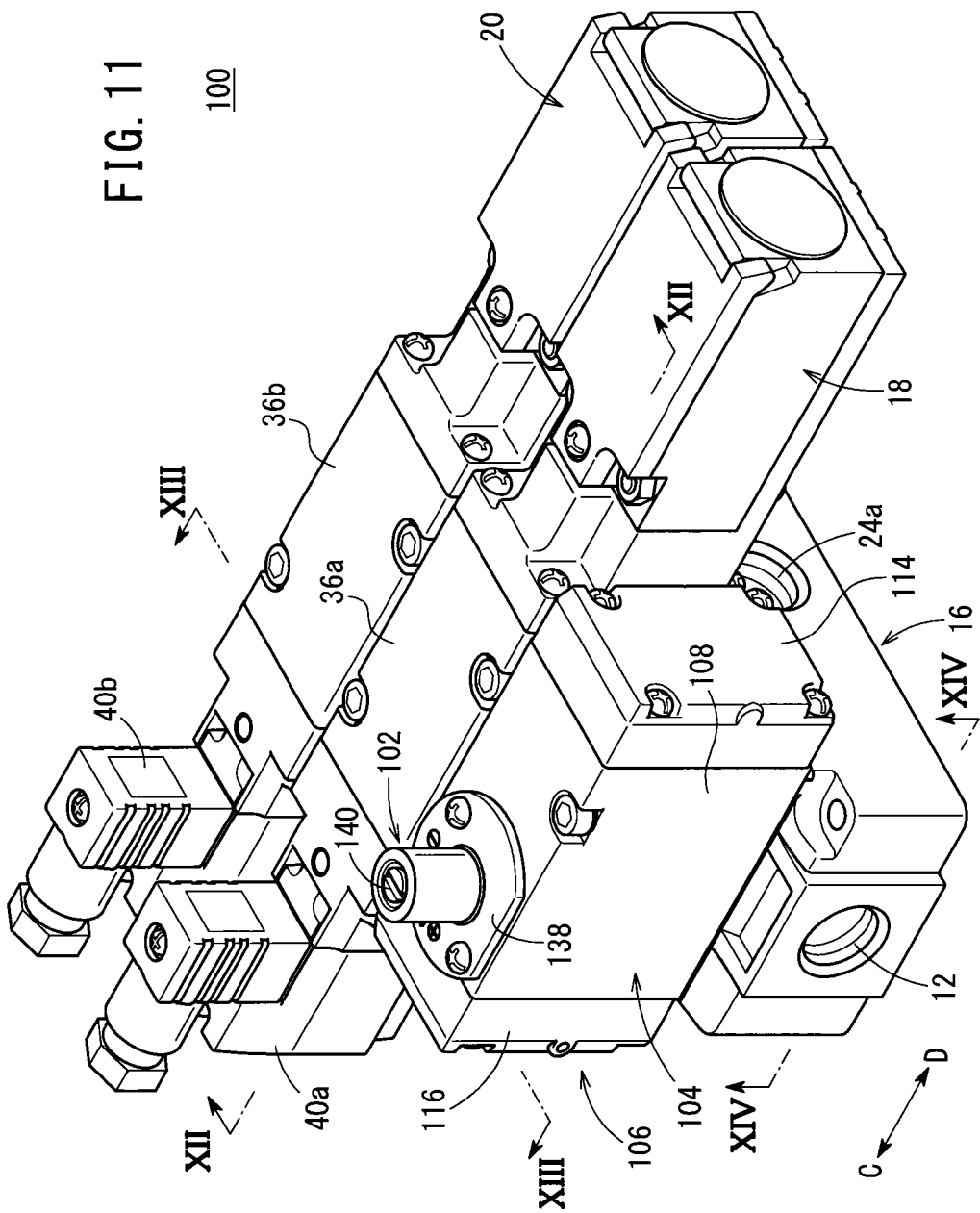
FIG. 11 is an exterior perspective view showing the appearance of a flow rate control apparatus according to a second embodiment of the present invention.

In this case, as shown in FIG. 10, the pressure P2 of the pressure fluid discharged from the second port 14 is roughly one half or less than half the pressure P1 of the pressure fluid supplied to the first port 12 (½P1>P2). More specifically, the pressure fluid supplied to the first port 12 passes through the throttle mechanism 86, and by flowing downstream to the side of the second flow passage 28, the pressure (flow rate) thereof is restricted beforehand by roughly one half (½P1).

Next, the pressure fluid, which is supplied to the fourth flow passage 32, flows into the second piston chamber 80, whereupon the second piston 68 in the opening/closing valve 22 is displaced toward the side of the push rod 70 (in the direction of the arrow D), and by the push rod 70 being pressed toward the side of the valve seat 74 (in the direction of the arrow D), a valve-open condition is brought about in which the valve body 72 is separated away from the valve seat 74. As a result, the pressure fluid supplied to the first flow passage 26 passes through the communication chamber 34 in which the push rod 70 is disposed, and then flows into the second flow passage 28.

More specifically, in addition to the pressure fluid that has flowed from the first flow passage 26 into the second flow passage 28 under an adjustment action of the throttle mechanism 86, by an opening operation of the opening/closing valve 22, the pressure fluid flows simultaneously through the communication chamber 34 from the first flow passage 26 to the second flow passage 28. Owing thereto, the pressure of the pressure fluid that flows from the first port 12 to the second port 14 gradually begins to increase (P2>½P1), such that ultimately, as shown in FIG. 10, the pressure at the first port 12 becomes equal to the pressure at the second port 14 (P1=P2).

With the above-described flow rate control apparatus 10, as can be understood from the characteristic curve shown in FIG. 10, by placing the opening/closing valve 22 in a valve-closed state in the initial condition, the flow rate of the pressure fluid that flows from the first port 12 to the second port 14 is restricted by the throttle mechanism 86, and after elapse of a predetermined time from the initial condition, the opening/closing valve 22 is placed in a valve-open state, so that the flow rate of the pressure fluid that flows from the first port 12 to the second port 14 can be increased (soft start). By providing such a structure, the pressure fluid supplied to the first port 12 can be prevented from being supplied abruptly and at an excessive flow rate with respect to a fluid pressure device or the like that is connected to the second port 14, whereby damage to the fluid pressure device can reliably be prevented.

On the other hand, in the case that the residual pressure fluid in the interior of the body 16 is to be discharged, initially, the first solenoid valve 18 is energized while supply of current to the second solenoid valve 20 is stopped, whereby the solenoid section 40b of the second solenoid valve 20 is placed in a non-excited state, accompanied by deactivation of the pressing force applied with respect to the shaft valve 38b in a direction to separate away from the solenoid section 40b. Consequently, as shown in FIG. 7, the shaft valve 38b is pressed toward the side of the solenoid section 40b (in the direction of the arrow A) by the elastic force of the spring 42b, the valve section 56b thereof is seated on the first valve seat 52b, and communication between the third flow passage 30 and the fourth flow passage 32 is blocked. Accordingly, the secondary side (downstream side) pressure fluid passes through the fourth flow passage 32 and is discharged to the exterior from the other discharge port 24b.

In this case, in the opening/closing valve 22, since the pressure of the pressure fluid supplied to the second piston chamber 80 from the fourth flow passage 32 decreases, the pressing force of the second piston 68 toward the side of the push rod 70 becomes smaller and is overcome by the elastic force of the return spring 76. Therefore, the push rod 70 is displaced toward the side of the second piston 68 (in the direction of the arrow C), and the valve body 72 is seated on the valve seat 74 (see FIGS. 3 and 8). As a result, communication between the first flow passage 26 and the second flow passage 28 through the communication chamber 34 is blocked.

Next, supply of current to the first solenoid valve 18 is stopped while the second solenoid valve 20 is placed in an energized condition, whereby the solenoid section 40a of the first solenoid valve 18 is placed in a non-excited state, accompanied by deactivation of the pressing force applied with respect to the shaft valve 38a in a direction to separate away from the solenoid section 40a. Consequently, as shown in FIG. 6, the shaft valve 38a of the first solenoid valve 18 is pressed toward the side of the solenoid section 40a (in the direction of the arrow A) by the elastic force of the spring 42a, the valve section 56a thereof is seated on the first valve seat 52a, and communication between the second flow passage 28 and the third flow passage 30 is blocked. As a result, the secondary side (downstream side) pressure fluid passes through the third and fourth flow passages 30, 32 and is discharged to the exterior from the one discharge port 24a.

Furthermore, by stopping supply of current to either one of the first and second solenoid valves 18, 20, the solenoid sections 40a, 40b of the first and second solenoid valves 18, 20 are placed in a non-excited state, respectively, accompanied by deactivation of the pressing forces applied with respect to the shaft valves 38a, 38b in directions to separate away from the solenoid sections 40a, 40b. Consequently, the valve sections 56a, 56b of the shaft valves 38a, 38b of the first and second solenoid valves 18, 20 are seated respectively on the first valve seats 52a, 52b, and communications between the second flow passage 28 and the third flow passage 30, as well as between the third flow passage 30 and the fourth flow passage 32 are blocked, respectively.

As a result, concerning the secondary side (downstream side) pressure fluid, the residual pressure fluid in the third flow passage 30 is discharged to the exterior from one of the discharge ports 24a, and simultaneously therewith, the residual pressure fluid further downstream in the fourth flow passage 32 is discharged to the exterior from the fourth flow passage 32 after passing through the other discharge port 24b.

More specifically, by stopping supply of current to at least one of the first and second solenoid valves 18, 20, the secondary side pressure fluid can be discharged to the exterior of the body 16. Stated otherwise, even in the case that one of the first and second solenoid valves 18, 20 suffers from a failure and becomes inoperable, by operation of the other first or second solenoid valve 18, 20 that does not suffer from the failure and functions normally, the secondary side pressure fluid can reliably be discharged to the exterior.

In the foregoing manner, according to the first embodiment, because the opening/closing valve 22 and the first and second solenoid valves 18, 20 are connected integrally with respect to the body 16, compared to a structure in which the body 16, the opening closing valve 22, and the first and second solenoid valves 18, 20 are provided separately and are connected respectively by piping or the like, since a piping arrangement is rendered unnecessary, the number of component parts and assembly steps can be reduced, and the flow rate control apparatus 10 can be made smaller in scale.

Further, when maintenance on the flow rate control apparatus 10 is performed, since the push rod 70, the valve body 72, and the second piston 68 can easily be replaced simply by removal of the first and second cover members 64, 66, ease of maintenance can be facilitated.

Furthermore, by initially placing the opening/closing valve 22 in a valve-closed state, the pressure fluid supplied to the first port 12 can be prevented from being supplied abruptly from the second port 14 with respect to a fluid pressure device or the like that is connected to the secondary side. Then, after elapse of a predetermined time, the pressure fluid that flows to the second port 14 is supplied while the flow rate (pressure) of the pressure fluid is increased by a valve-opening operation of the opening/closing valve 22. Thus, damage to the fluid pressure device or the like can reliably be prevented.

Further still, since two solenoid valves, i.e., the first and second solenoid valves 18, 20, are provided, even if for some reason one of the solenoid valves malfunctions and becomes inoperative, by operating a remaining one of the solenoid valves that can be operated normally, the residual pressure fluid on the secondary side can reliably be discharged to the exterior.

Still further, since pilot air, which is supplied to the first and second solenoid valves 18, 20, is supplied from a primary side on an upstream side of the opening/closing valve 22, the first and second solenoid valves 18, 20 can be operated without being unduly influenced by opening and closing operations of the opening/closing valve 22.

Further, by disposing the opening/closing valve 22 on the upstream side (primary side) of the first and second solenoid valves 18, 20, even in the event that, for some reason, the opening/closing valve 22 suffers from a malfunction and cannot be placed in a valve-close state or the like, by switching between the first and second solenoid valves 18, 20, the residual pressure fluid remaining in the interior of the body 16 can suitably be discharged to the exterior from the discharge ports 24*a*, 24*b*.

Furthermore, because the first and second solenoid valves 18, 20 are connected integrally to the upper portion of the body 16 in communication with the interior of the body 16, complicated operations, such as connection of pipes or the like to the body 16 and the first and second solenoid valves 18, 20, are rendered unnecessary. As a result, ease of assembly of the flow rate control apparatus 10 can be enhanced.

Next, a flow rate control apparatus 100 according to a second embodiment is shown in FIGS. 11 through 15. Structural elements thereof, which are the same as those of the flow rate control apparatus 10 according to the first embodiment, are designated using the same reference characters, and detailed descriptions of such features are omitted.

The flow rate control apparatus 100 according to the second embodiment differs from the flow rate control apparatus 10 according to the first embodiment, in that an adjustment unit 106 is provided having a throttle mechanism 102 and a switching mechanism 104, and the adjustment unit 106 is disposed in a detachable manner with respect to the body 16.

As shown in FIGS. 11 through 14, in the flow rate control apparatus 100, the adjustment unit 106 is connected in parallel with the first and second solenoid valves 18, 20 on an upper portion of the body 16 having the first and second ports 12, 14. The adjustment unit 106 is disposed on the side of the first port 12 adjacent to the first solenoid valve 18. The adjustment unit 106 is equipped with a housing 108, which is formed with a rectangular shape in cross section, the switching mechanism 104 including an opening/closing valve 110 disposed displaceably in the interior of the housing 108, and the throttle mechanism 102 disposed on an upper part of the housing 108.

The switching mechanism 104 is made up from a 3-port valve, for example, and is formed with a shaft hole 112 that penetrates in a longitudinal direction (the directions of arrows C and D) in the interior of the housing 108. The opening/closing valve 110, to be described later, is accommodated displaceably in the shaft hole 112. Further, on both ends of the housing 108, first and second end covers 114, 116 are mounted respectively to close the shaft hole 112.

Further, in the housing 108, a second communication passage 120 and a pair of first communication passages 118*a*, 118*b* are formed, which penetrate downwardly perpendicular to the shaft hole 112. The first communication passages 118*a*, 118*b* are arranged respectively on one end and another end in the axial direction of the shaft hole 112, whereas the second communication passage 120 is arranged at a substantially central position in the axial direction. In addition, the first and second communication passages 118*a*, 118*b*, 120 communicate at upper portions thereof with the shaft hole 112, whereas lower portions thereof communicate respectively with the first and second flow passages 26, 28 of the body 16.

In the interior of the first end cover 114, a second piston 122 is accommodated displaceably in confronting relation to the shaft hole 112. An end of the second piston 122 abuts against an end of the opening/closing valve 110. In addition, by supply of a pressure fluid to a second piston chamber 124, which is formed in the interior of the first end cover 114, the second piston 122 is biased (in the direction of the arrow C) toward the side of the opening/closing valve 110, accompanied by the opening/closing valve 110 being pressed (in the direction of the arrow C) to separate away from the first end cover 114. The second piston chamber 124 communicates with the fourth flow passage 32 that is formed in the body 16.

On the other hand, in the interior of the second end cover 116, a spring holder 126 is disposed in confronting relation to the shaft hole 112. A return spring 128 is disposed between the spring holder 126 and the opening/closing valve 110. The return spring 128 is made up from a coil spring, for example, and the elastic force thereof biases the opening/closing valve 110 so as to be pressed toward the side of the first end cover 114 (in the direction of the arrow D). The interior of the second end cover 116 communicates with the first communication passage 118*b*.

The one end and another end of the opening/closing valve 110 along the axial direction (the directions of arrows C and D) are supported displaceably by guide bodies 130*a*, 130*b*, which are mounted respectively in the shaft hole 112. A valve section 132, which is formed substantially in the center in the axial direction, is seated on a first valve seat 134 and a second valve seat 136, which are formed in the guide bodies 130*a*, 130*b*, for thereby switching a state of communication between the second communication passage 120 with either one of the pair of first communication passages 118*a*, 118*b* formed in the housing 108.

More specifically, under a displacement action thereof, the opening/closing valve 110 functions as a 3-port valve, which is capable of switching the state of communication between the second communication passage 120 and either one of the first communication passages 118*a*, 118*b*.

The throttle mechanism 102 is disposed on another end side (in the direction of the arrow C) of the opening/closing valve 110 in the housing 108. The throttle mechanism 102 is equipped with a needle holder 138, which is connected to an upper surface of the housing 108, and a needle valve (throttle valve) 140 that is screw-engaged in the needle holder 138. The needle valve 140 is disposed perpendicularly to the opening/closing valve 110. The needle valve 140 is disposed so as to be capable of being advanced and retracted in an axial direction upon screw-rotation thereof, such that by adjusting a clearance between a tapered distal end thereof and the needle holder 138, the flow rate of a pressure fluid that flows through the clearance from the first communication passage 118*b* to the second communication passage 120 is adjusted. Moreover, portions of the needle holder 138 and the needle valve 140 that make up the throttle mechanism 102 are disposed so as to project a predetermined height with respect to the upper surface of the housing 108.

The flow rate control apparatus 100 according to the second embodiment of the present invention is constructed basically as described above. Next, operations and advantages thereof will be explained. Operations thereof, which are the same as those of the flow rate control apparatus 10 according to the above-described first embodiment, will not be explained in detail below.

Figure 12:
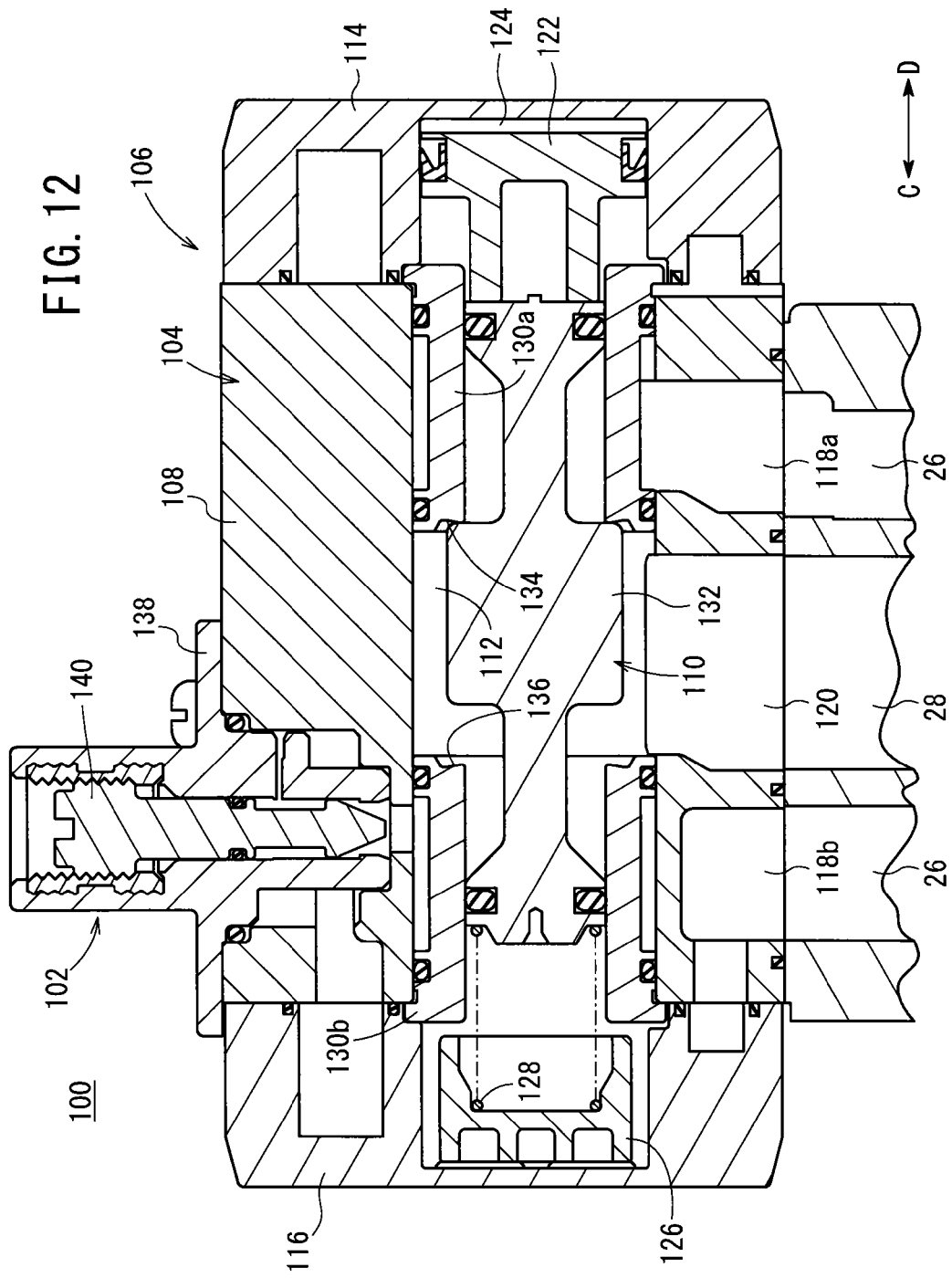
FIG. 12 is a cross sectional view taken along line XII-XII of FIG. 11.
Figure 13:
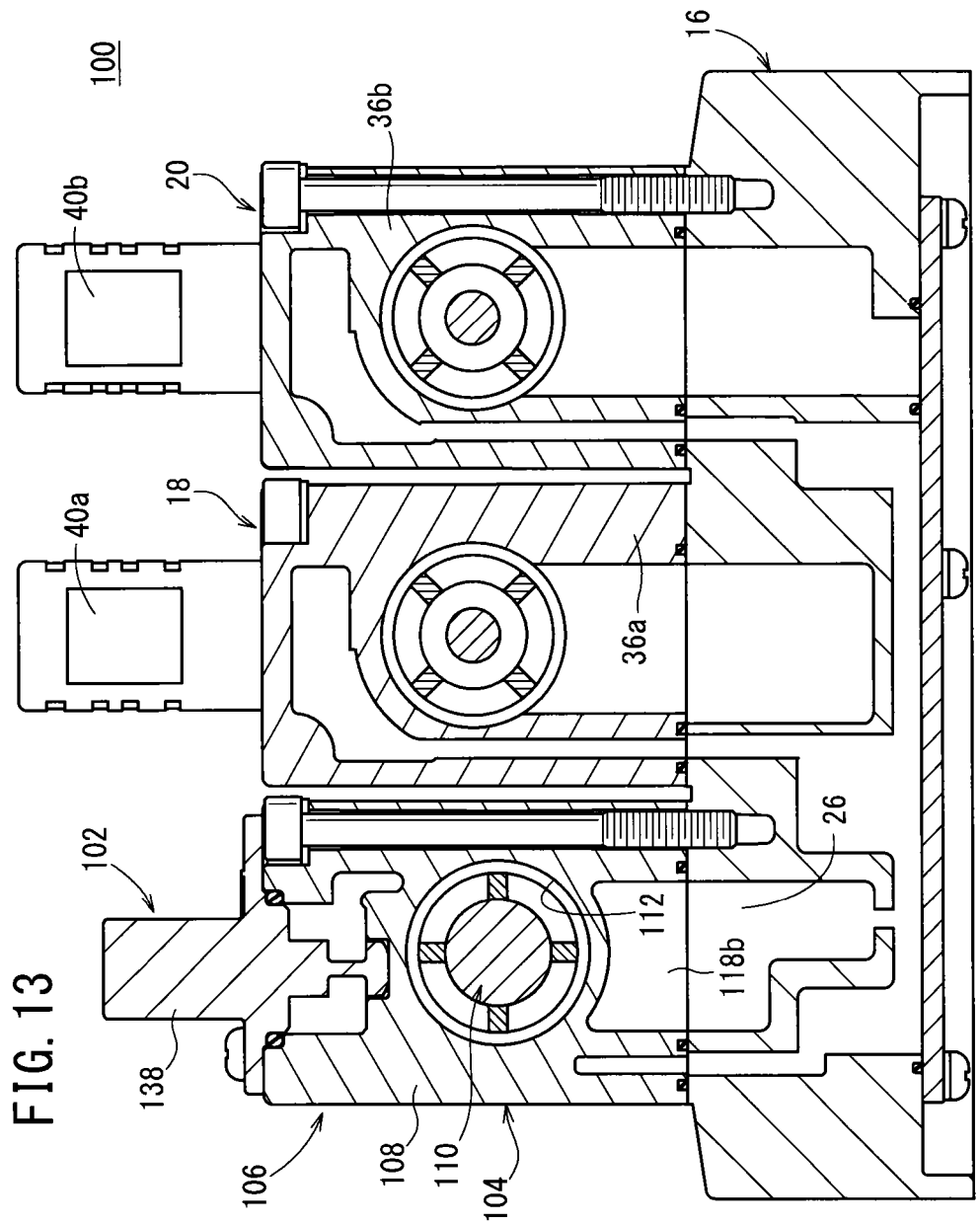
FIG. 13 is a cross sectional view taken along line XIII-XIII of FIG. 11.
Figure 14:
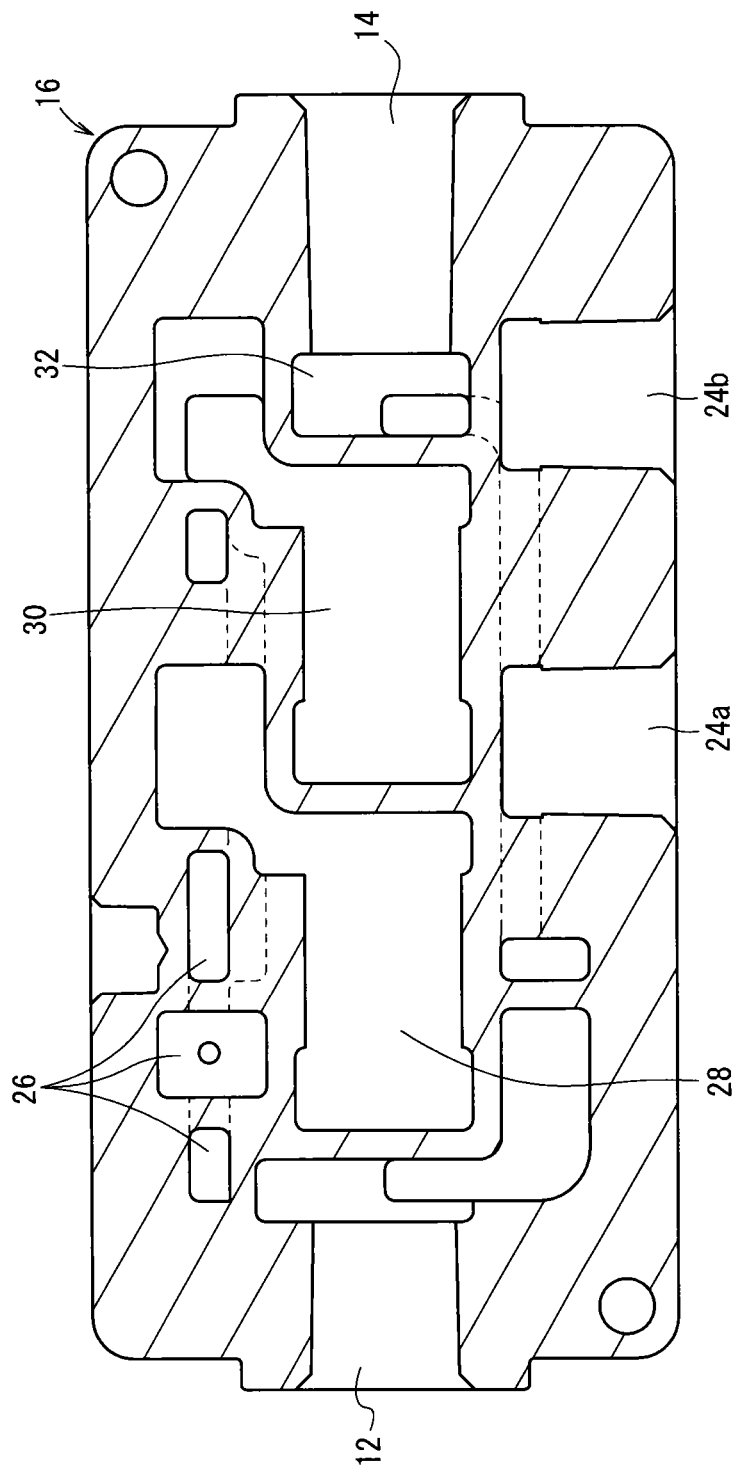
FIG. 14 is a cross sectional view taken along line XIV-XIV of FIG. 11.
Figure 15:
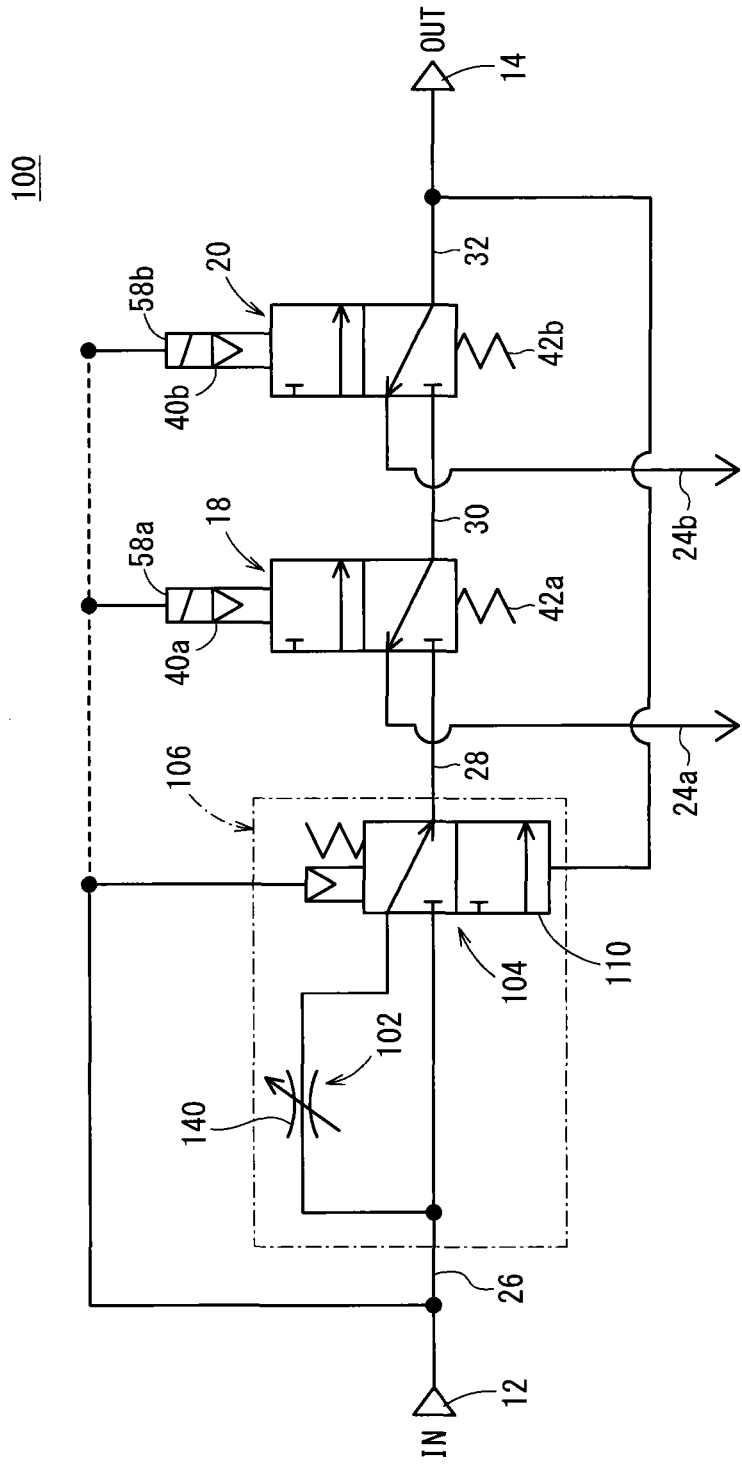
FIG. 15 is a circuit diagram of the flow rate control apparatus shown in FIG. 11.

Further, as shown in FIG. 12, in the flow rate control apparatus 100, an initial condition will be described, in which the valve section 132 of the opening/closing valve 110 of the adjustment unit 106 is seated on the first valve seat 134, thereby blocking communication between the first flow passage 26 and the second flow passage 28 through the first communication passage 118*a*, and the first and second solenoid valves 18, 20 are in a non-energized condition such that communication of the second through fourth flow passages 28, 30, 32 is blocked. In this case, the pressure fluid, which is supplied from the first port 12 to the first flow passage 26, flows from the first communication passages 118*b* and is restricted to a predetermined flow rate by the throttle mechanism 102, and thereafter flows to the second flow passage 28 through the second communication passage 120.

In the initial condition, by supply of current to energize the first solenoid valve 18, pilot air is supplied to the first piston chamber 60a, accompanied by the first piston 62a being displaced, and the valve section of the shaft valve 38a is displaced to separate away from the first valve seat 52a. In addition, by seating of the valve section 56a on the second valve seat 54a, communication is established between the first communication passage 46a and the second communication passage 48a, and the pressure fluid, which is supplied to the second flow passage 28, flows to the third flow passage 30.

Next, in a condition in which current continues to be supplied to the first solenoid valve 18, by supply of current to energize the solenoid section 40b of the second solenoid valve 20, pilot air is supplied to the first piston chamber 60b of the second solenoid valve 20, the first piston 62b is displaced, and the valve section 56b of the shaft valve 38b separates away from the first valve seat 52b. Thus, communication is established between the first communication passage 46b and the second communication passage 48b, and the pressure fluid, which is supplied to the third flow passage 30, flows to the fourth flow passage 32 and thereafter is discharged from the second port 14.

In this case, because the flow rate of the pressure fluid that flows from the first port 12 to the second port 14 is restricted to a predetermined flow rate by the throttle mechanism 102, the pressure P2 of the pressure fluid discharged from the second port 14 is reduced by a predetermined pressure with respect to the pressure P1 of the pressure fluid supplied to the first port 12 (P1>P2).

Next, the pressure fluid, which is supplied to the fourth flow passage 32, flows as pilot air into the second piston chamber 124 of the adjustment unit 106, whereupon the second piston 122 is displaced toward the side of the opening/closing valve 110 (in the direction of the arrow C), and by the opening/closing valve 110 being pressed toward the side of the second valve seat 136 in opposition to the elastic force of the return spring 128 and the pressing force of return air, which is supplied to the interior of the second end cover 116 through the first communication passage 118b, a valve-open condition is brought about in which the valve section 132 is separated away from the first valve seat 134. Consequently, the pressure fluid, which is supplied from the first flow passage 26 to the first communication passage 118b, is supplied from the other first communication passage 118a and through the shaft hole 112 directly to the second communication passage 120, whereas supply of the pressure fluid, which is supplied to the second communication passage 120 through the throttle mechanism 102, is blocked.

More specifically, in the opening/closing valve 110 that makes up the switching mechanism 104, under a supply action of the pilot air, the valve section 132 is made to separate away from the first valve seat 134 in opposition to the elastic force of the return spring 128 and the pressing force of the return air, and the valve section 132 is seated on the second valve seat 136, whereby a switching operation is carried out in which communication between the first communication passage 118b and the second communication passage 120 is blocked, whereas communication is established between the other first communication passage 118a and the second communication passage 120.

Further, concerning the timing at which the pressure of the pressure fluid, which is supplied from the first port 12 to the second port 14, is changed, the piston area of the second piston 122 is set so that switching takes place in the case that the pilot air, which is supplied to the second piston chamber 124 and biases the opening/closing valve 110 toward the side of the second valve seat 136 (in the direction of the arrow C), becomes roughly one half the pressure of the return air.

Owing thereto, the flow rate (pressure) of the pressure fluid that is discharged to the exterior through the second port 14 can be increased. More specifically, in the initial condition, by placing the opening/closing valve 110 of the adjustment unit 106 in a valve-closed state in which it is seated on the first valve seat 134, the pressure fluid flows from the first port 12 to the second port 14 at a flow rate that is restricted by the throttle mechanism 102. In addition, from the initial condition, in the event that the pressure of the pilot air supplied to the second piston chamber 124 becomes roughly one half of the pressure of the pressure fluid supplied to the first port 12 or greater, the opening/closing valve 110 is placed in a valve-open state and the pressure fluid is allowed to flow without passing through the throttle mechanism 102, whereby the flow rate of the pressure fluid that flows from the first port 12 to the second port 14 can be increased (soft start). By providing such a structure, the pressure fluid supplied to the first port 12 can be prevented from being supplied abruptly and at an excessive flow rate with respect to a fluid pressure device or the like that is connected to the second port 14, whereby damage to the fluid pressure device can reliably be prevented.

In the foregoing manner, in accordance with the second embodiment, the adjustment unit 106 having the throttle mechanism 102 and the switching mechanism 104 is provided in the body 16 that makes up the flow rate control apparatus 100. By providing the adjustment unit 106 so as to be detachable with respect to the body 16, exchange and replacement of the adjustment unit 106 can easily be performed, ease of maintenance of the throttle mechanism 102 and the switching mechanism 104 can be enhanced, and a soft start can be realized in which abrupt supply of pressure fluid with respect to a fluid pressure device or the like can be avoided.

Further, switching of the supply state of the pressure fluid by the opening/closing valve 110 of the switching mechanism 104 can be set beforehand by the piston area of the second piston 122. Therefore, switching of the supply state can be performed efficiently and reliably without the need for an operator to carry out switching operations each time. Further, the need for exchanging the return spring 128, which biases the opening/closing valve 110 toward the side of the first valve seat 134, with another different return spring can advantageously be avoided.

Further, with the above-described flow rate control apparatus 100 according to the second embodiment, a structure is provided in which the opening/closing valve 110 is biased toward the side of the first valve seat 134 by the return air and the elastic force of the return spring 128, whereas the opening/closing valve 110 is biased toward the side of the second valve seat 136 under a supply action of the pilot air that is supplied to the second piston chamber 124. However, the invention is not limited to this structure. For example, the opening/closing valve 110 may be operated to switch the supply state of the pressure fluid only by the return spring 128, without using the return air.

The flow rate control apparatus according to the present invention is not limited to the embodiments described above, and various modified or additional structures may be adopted therein without deviating from the scope of the invention as set forth in the appended claims.

The invention claimed is:
1. A flow rate control apparatus comprising:
  a body defining passages therein through which a pressure fluid can flow, the body including a pair of ports through which the pressure fluid may be supplied and dis- charged, discharge ports through which the pressure fluid on a secondary side may be discharged, wherein said passages are connected to the ports and the discharge ports, and through which the pressure fluid flows;

an adjustment mechanism for adjusting a flow rate of the pressure fluid flowing from a first of the ports to a second of the ports, wherein the adjustment mechanism comprises a housing external to the body and detachably mounted to the body; and at least two switching valves for switching a communication state of the ports, the passages, and the discharge ports;

the adjustment mechanism includes a throttle mechanism provided to the housing for adjusting a flow rate of the pressure fluid flowing between the first port and the second port, and an opening/closing valve provided in the housing configured to switch a communication state of the first port and the second port, wherein the flow rate of the pressure fluid is increased or decreased in a stepwise manner under a switching action of the opening/closing valve.

2. The flow rate control apparatus according to claim 1, wherein the switching valves are disposed detachably with respect to the body.

3. The flow rate control apparatus according to claim 2, wherein the discharge ports are disposed in a same quantity corresponding to a quantity of the switching valves.

4. The flow rate control apparatus according to claim 1, wherein the switching valves are 3-port valves which are arranged mutually in series.

5. The flow rate control apparatus according to claim 4, wherein the switching valves are solenoid valves having solenoid sections that are excitable by supply of current thereto.

6. The flow rate control apparatus according to claim 1, wherein the throttle mechanism includes a needle valve that advances and retracts along an axial direction, the flow rate being adjusted by displacement of the needle valve.

7. The flow rate control apparatus according to claim 1, wherein the flow rate of the pressure fluid from the first port to the second port in an initial flow condition thereof is restricted and reduced by the throttle mechanism, and then the flow rate is increased by switching the opening/closing valve.

8. The flow rate control apparatus according to claim 7, wherein, in the opening/closing valve, the communication state between the first port and the second port through the throttle mechanism is maintained under an elastic action of a spring, and by displacement of the opening/closing valve in opposition to an elastic force upon supply of pilot air, the communication state between the first port and the second port is switched by the opening/closing valve.

9. The flow rate control apparatus according to claim 7, wherein the opening/closing valve switches the communication state between the first port and the second port through the throttle mechanism under an elastic action of a spring.

10. The flow rate control apparatus according to claim 7, wherein the opening/closing valve is a 3-port valve.

\* \* \* \* \*